United States Patent [19]

Ellison

[11] 4,257,165
[45] Mar. 24, 1981

[54] THUMB PITCH COMPENSATING SPAN GAUGE

[76] Inventor: John D. Ellison, 2451 W. 234 St., Torrance, Calif. 90501

[21] Appl. No.: 48,062

[22] Filed: Jun. 13, 1979

[51] Int. Cl.³ .............................................. G01B 5/02
[52] U.S. Cl. ................................ 33/174 F; 33/178 B; 273/54 R
[58] Field of Search ............. 33/125 R, 174 R, 174 F, 33/177, 178 B, 178 D, 485, 492; 273/37, 54 R, 63 R

[56] References Cited

U.S. PATENT DOCUMENTS

| | | | |
|---|---|---|---|
| 754,513 | 3/1904 | Swenson | 33/177 |
| 3,276,134 | 10/1966 | Szwajkowski | 33/174 F |
| 3,429,049 | 2/1969 | Snoddy | 33/174 F |

Primary Examiner—Richard R. Stearns
Attorney, Agent, or Firm—Donald D. Mon

[57] ABSTRACT

A span gauge for measuring the distance between a thumb hole and a finger hole on a bowling ball comprised of a plate having a curved edge fitting the contour of the bowling ball and an angle positioning post pivotally attached to the edge of the plate. The radius of curvature on the curved edge is equal to the radius of curvature of the surface of the bowling ball and the pivoting post is attached to one end of the curved edge. A calibrated scale on the curved edge permits measurement by inserting the pivoted post in a pre-drilled thumb hole to determine the point at which the finger hole is to be drilled. The pivoted post allows the span gauge to compensate for the pitch angle of pre-drilled thumb holes which may vary from ball to ball.

2 Claims, 3 Drawing Figures

THUMB PITCH COMPENSATING SPAN GAUGE

BACKGROUND OF THE INVENTION

This invention relates to span gauges for measuring the span between thumb and finger holes of a bowling ball and includes means for automatically compensating for the pitch angle of a pre-drilled thumb hole.

When finger holes are made in a bowling ball a thumb hole is first pre-drilled and then the finger holes are measured from the nearest point on the diameter of the thumb hole. This is usually done with a gauge having a curved surface matching the curvature of the bowling ball. Usually these gauges have a fixed tongue for engaging the edge of the thumb hole to position the span gauge for measuring to the finger hole. This fixed tongue however, does not allow adjustment of the span gauge for differences in the pitch angle from one thumb hole in one ball to a different angle thumb hole in another ball. Thus, the curved edge may not mate correctly with the curvature of the ball, thereby creating an error in the measurement. This is a disadvantage because the correct measurement is extremely important to prevent misalignment of the finger holes. This misalignment can not only cause damage to the fingers but also can disturb the aim in the delivery of the ball. Further, once an error has been made in the placement of the finger holes it is difficult if not impossible to correct.

SUMMARY OF THE INVENTION

The purpose of the present invention is to provide a span gauge which allows the gauge to compensate for the pitch angle of predrilled thumb holes for accurate mating of the curved edge of the span gauge against the curved surface of the ball in order to accurately measure the distance between the thumb hole and the finger holes.

The span gauge is comprised of a plate having a curved edge with a calibrated scale for measuring the distance from the thumb hole to the finger holes. The curved edge has a radius of curvature equal to the radius of curvature of the bowling ball in order to mate perfectly with the surface of the ball. In addition, one end of the curved edge has a fitted post which can conform to the particular pitch angle of the pre-drilled thumb hole. The axes of the pre-drilled thumb holes in many cases are not coincident with a diameter of the ball and in fact may vary as much as 30° from a diameter.

It is an object of the present invention to provide a span gauge which automatically responds to the pitch angle of a predrilled thumb hole allowing the curved calibrated edge of span gauge plate to mate perfectly with the curved surface of the ball for accurate measurement and placement of finger holes.

These and other objects will become apparent from the accompanying drawings wherein.

DESCRIPTION OF THE PREFERRED EMBODIMENT

Figure 1:
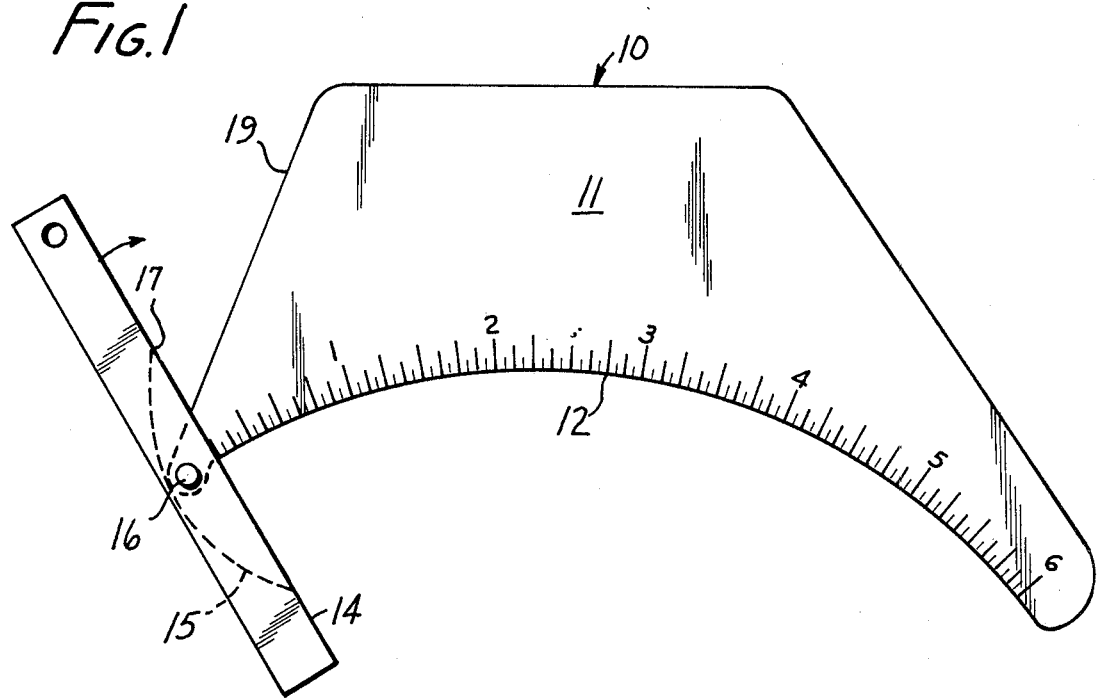
FIG. 1 is a plan view of the span gauge according to the invention.

Referring now to FIG. 1 there is shown a span gauge 10 comprised of a plate 11 somewhat trapezoidal in shape having a curved edge 12 and a post 14 fastened by a pin 16 at one end of the curved edge 12. Curved edge 12 has a radius of curvature equal to the radius of curvature of the usual bowling ball. On the curved edge is a calibrated scale which can be in inches, or any other convenient scale, for measuring the finger span from a pre-drilled thumb hole to subsequent finger holes. The post 14 has a longitudinal slot 15 into which the end 13 of plate 11 fits and is held by pin 16. The end 17 of the slot 15 acts as a limit stop when it abuts the edge 19 of the plate 11.

Figure 2:
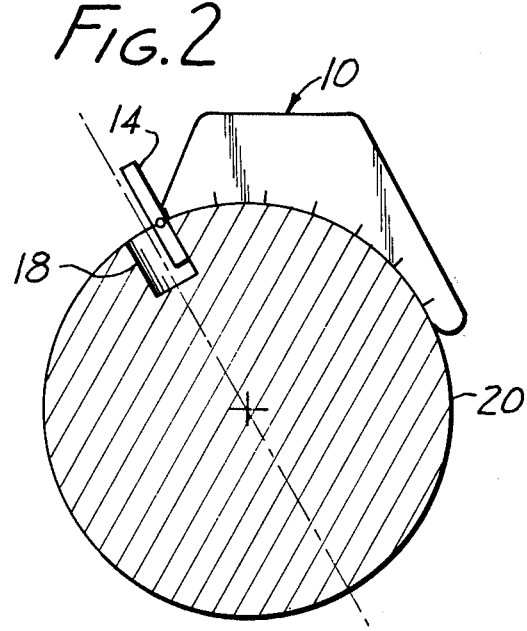
FIG. 2 illustrates the method of measuring the position of a finger hole from a pre-drilled thumb hole which is coincident with a diameter of the bowling ball.
Figure 3:
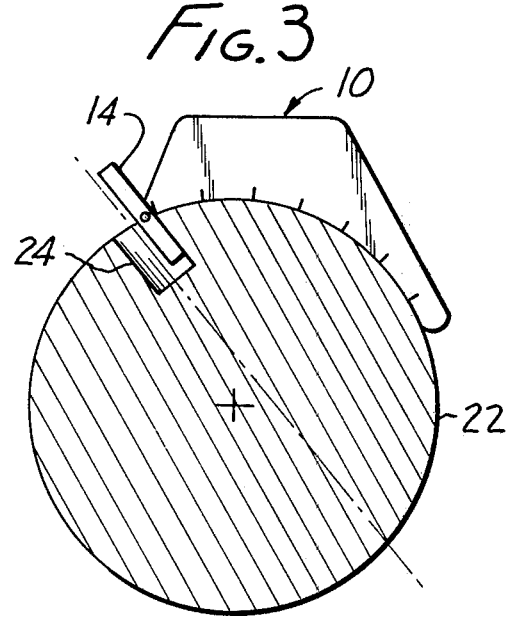
FIG. 3 illustrates the automatic angle compensation of the pivoting post of the span gauge for a pre-drilled thumb hole at an offset angle to a diameter of the ball.

The span gauge is used as shown in FIGS. 2 and 3 with the pivoting post 14 allowing the span gauge to automatically compensate for the pitch angle of a pre-drilled thumb hole. In FIG. 2 the pre-drilled thumb hole 18 of bowling ball 20 is coincident with a diameter (i.e. on a line through the center of the ball). The post 14 because it is pivoted can fit against the inner surface of the pre-drilled thumb hole 18 conforming to the pitch angle allowing the curved edge of the span gauge to mate perfectly with the surface curvature of the ball. Thus the distance (i.e. finger span) from the nearest edge or point on the perimeter of the thumb hole 18 to the finger hole can be accurately measured and marked.

In FIG. 4 the span gauge 10 is shown in use with a bowling ball 22 having a pre-drilled thumb hole 24 which a has a pitch angle which is offset from the ball's center line. Again the post 14 because it may pivot, can automatically compensate for the pitch angle by pivoting to the correct angle of thumb hole 24. This permits the curved edge 12 on the span gauge 10 to mate perfectly with the curved surface of the ball allowing accurate measurement of the finger holes. The span gauge can thus be used from one ball to another regardless of the pitch of the pre-drilled thumb hole. With the previous span gauges the fixed tongue when inserted in an angled thumb hole prevents the curvature of the gauge from mating perfectly with the ball surface creating an error in measurement.

This invention is not to be limited to the embodiment shown in the drawings and described in the description which is given by way of example and not of limitation, but only in accordance with the scope of the appended claims.

I claim:

1. A span gauge for determining finger span for finger hole placement in a bowling ball comprising:
   a plate, one edge of said plate being curved, the radius of curvature of said edge being approximately equal to the curvature of the ball being measured; a calibrated scale on said curved edge; pivoted pitch angle responsive means attached to one end of said curved edge whereby the pitch of a first finger hole during measurement for placement of another finger hole is automatically compensated for, said pivoted pitch angle responsive means comprising a retangular rod pivotally attached to one end of said curved edge, said rectangular rod having a longitudinal slot, the corner of said plate at the end of said curved edge being positioned within said slot; and a pivot pin passing through said rod and said corner of said plate.

2. The span gauge according to claim 1 wherein said longitudinal slot has a predetermined length whereby the end of said slot acts as a limiting stop.